Patented June 24, 1930

1,766,443

UNITED STATES PATENT OFFICE

ARTHUR LÜTTRINGHAUS AND FILIP KAČER, OF MANNHEIM, GERMANY, ASSIGNORS TO GENERAL ANILINE WORKS, INC., OF NEW YORK, N. Y., A CORPORATION OF DELAWARE

PRODUCTION OF ALKYL KETONES OF THE ANTHRACENE SERIES

No Drawing. Application filed March 24, 1927, Serial No. 178,134, and in Germany July 15, 1926.

We have found that anthracyl-alkyl-ketones are produced by the action of fatty-acid halogenides on anthracene, or its homologues or derivatives the products varying in accordance with the working conditions employed.

When working under rigorous conditions, alpha- or beta-anthracyl-alkyl-ketones, or mixtures of the same, are obtained. These compounds can be transformed into anthraquinone derivatives by treatment with oxidizing agents, such as chromic acid dissolved in glacial acetic acid. The resulting anthracene and anthraquinone derivatives form valuble starting materials for the production of dyestuffs.

Meso-anthracyl-alkyl-ketones are obtained by working under milder conditions than those required for the production of the alpha- or beta-anthracyl-alkyl-ketones, for example, when conducting the operation at lower temperatures, or curtailing the duration of the reaction, or using larger quantities of solvent or diluent or a considerable excess of the fatty-acid halogenide, which excess by itself acts like a solvent or diluent.

Aluminium chlorid is a very suitable condensing agent for the reaction according to the present invention, but other condensing agents splitting off hydrochloric acid such as ferric chlorid or zinc chlorid or the like may also be employed.

We have also found that the meso-anthracyl-alkyl-ketones are transformed into the corresponding alpha- or beta-anthracyl-alkyl-ketones, by the action of condensation agents, such as aluminium chlorid, under stronger conditions, as for example at higher temperature, or for a longer period, or with increased concentration.

The following examples will further illustrate the nature of the said invention which however is not limited to these examples. The parts are by weight.

Example 1

178 parts of anthracene and 234 parts of acetyl chlorid are introduced into 1000 parts of benzene. The mixture is continuously stirred in a refrigerating mixture until cooled down to from 0° to 10° C., whereupon 400 parts of aluminium chlorid are introduced so gradually that the temperature remains at between 0° and 10° C. throughout the period of its introduction. Stirring is continued afterwards, for from 4 to 5 hours, without cooling. After prolonged standing, the red precipitate is filtered off by suction, washed with benzene, and decomposed with water in the usual manner.

The resulting mixture consists of alpha- and beta-anthracyl-methyl-ketone, and can be separated, by means of alcohol, into the more readily soluble alpha-anthracyl-methyl-ketone having a melting point of from 103° to 105° C. and the more sparingly soluble beta-anthracyl-methyl-ketone having a melting point of from 183° to 185° C. Both products form pale yellow crystals which dissolve to a red-violet solution in sulfuric acid, the colour changing to a yellow-red on standing.

Example 2

10 parts of alpha-anthracyl-methyl-ketone are heated to boiling with 100 parts of glacial acetic acid, and 12 to 13 parts of chromic anhydrid are slowly added so that the liquid remains in gentle ebullition. It is then diluted with water, and the deposited alpha-anthraquinonyl-methyl ketone is filtered off by suction, washed and dried. On re-crystallization from alcohol, it forms pale yellow needles having a melting point of from 158 to 160° C.

If beta-anthracyl-methyl-ketone be treated in the same manner, it furnishes beta-anthraquinonyl-methyl-ketone having a melting point of from 140° to 142° C. The alpha-ketone gives a red vat, and the beta-ketone a green vat.

Example 3

400 parts of aluminium chlorid are dissolved in 1000 parts of nitrobenzene. The solution is cooled down to 10° C. and mixed with 157 parts of acetyl chlorid, after which 178 parts of anthracene are stirred in, the whole being cooled so that the temperature remains at from 10° to 15° C. After stirring for 4 hours, the dark red crystal pulp is diluted with 1000 parts of benzene, filtered off by suction, and washed with benzene until the latter runs away clear. The red filter residue is stirred up with water, and the benzene still remaining is expelled by steaming. The resulting crude product is nearly pure alpha-anthracyl-methyl-ketone (1-acetyl-anthracene) and has the formula:

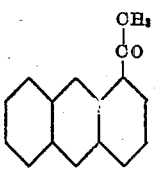

*Example 4*

133 parts of aluminium chlorid are dissolved in 1000 parts of nitrobenzene, the solution being then cooled down to 10° C. and mixed with 78.5 parts of acetyl chlorid, followed by the introduction of 178 parts of anthracene added while stirring and cooling so that the temperature remains at from 10° to 15° C. After stirring for four hours the dark red crystal pulp is diluted with 1000 parts of benzene, filtered off by suction, and washed with benzene until the latter runs away clear. The red residue is stirred up with water, and the benzene still remaining is expelled by steaming. The resulting crude product consists substantially of 2-acetyl-anthracene having the formula:

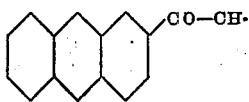

and also contains a small amount of 1-acetyl-anthracene. It is obtained in a perfectly pure state by recrystallization as, for example, from glacial acetic acid or chlorbenzene.

*Example 5*

133 parts of aluminium chlorid are dissolved in 615 parts of nitrobenzene. After cooling down to about 10° C., 92.5 parts of propionyl chlorid are added, and 178 parts of anthracene are introduced, the mixture being stirred continuously with ice. The subsequent treatment is the same as in Examples 3 and 4. The resulting crude product is nearly pure 2-propionyl-anthracene, which, in the pure state melts at from 162° to 163° C. and dissolves to a violet solution in sulfuric acid, the color quickly changing to yellow-red. On oxidation, for example with chromic acid in glacial acetic acid, 2-propionyl-anthracene furnishes 2-propionyl-anthraquinone, which melts at from 138° to 140° C. and furnishes a green hydrosulfit vat.

The nitrobenzene-benzene mother liquor from 2-propionyl-anthracene contains the isomeric 1-propionyl-anthracene in mixture with a little unaltered anthracene. It can be recovered in a pure state by crystallization, and then melts at about 150° C.

*Example 6*

400 parts of aluminium chlorid are introduced, while continuously stirring and cooling with ice, into 1000 parts of carbon disulfid, 235 parts of acetyl chlorid and 178 parts of anthracene being added. The temperature should remain at about 10° C. but is gradually allowed to rise to about 25° C. during a further period of 5 hours stirring. The reaction mass is then poured onto ice, and the surplus carbon disulfid is expelled by steaming. The crude product is filtered off by suction, washed with water and dried. On extraction, preferably with acetone, a diacetyl-anthracene having the formula:

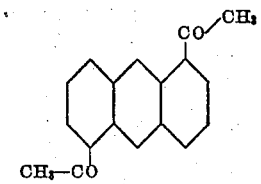

and a melting point of from 212° to 215° C. is recovered, in the form of yellow leaflets which dissolve to an orange-yellow solution with yellow fluorescence, in sulfuric acid. On oxidation with chromic acid, a diacetyl-anthraquinone, melting at from 318° to 319° C. is obtained.

The mother liquors contain a second, more readily soluble, diacetyl-anthracene, melting at about 173° C.

*Example 7*

178 parts of anthracene and 471 parts of acetyl chlorid are introduced into 1000 parts of benzene, and the mixture is cooled, to from −5° to 0° C. by continued, stirring in a refrigerating mixture. 267 parts of aluminium chlorid are then introduced so gradually that the temperature remains at from −5° to 0° C. After stirring for an hour, during which period the temperature is allowed to rise to about 10° C., the mixture is filtered off by suction and the residue washed with benzene. The residue is decomposed with water, and the adherent benzene is steamed off. The resulting crude product is a mixture of 9-anthracyl-methyl-ketone with a little unaltered anthracene. The ketone may be easily recovered in a pure state by recrystallization from alcohol, in which the 9-anthracyl-methyl-ketone is more readily soluble than anthracene. It forms compact pale yellow crystals with a melting point of about 80° C. which dissolve to a violet-red solution in sulfuric acid, the color soon changing to yellow and has the formula:

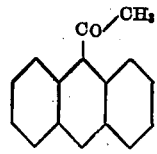

Oxidation of the product for example with chromic acid in glacial acetic acid, furnishes anthraquinone.

Example 8

110 parts of 9-anthracyl-methyl-ketone are dissolved in 500 parts of nitrobenzene, whereupon 67 parts of aluminium chlorid are gradually added, while continuously stirring, so that the temperature rises to 40° C. After stirring for 4 hours, 500 parts of benzene are added, and the red double salt is filtered off by suction, washed with benzene and decomposed with water. The resulting product consists of nearly pure 2-anthracyl-methyl-ketone.

What we claim is:

1. As new articles of manufacture, anthracyl-alkyl-ketones.

2. The process of producing anthracyl-alkyl-ketones which consists in acting on an anthracene body with a fatty acid halogenide and a condensing agent.

3. The process of producing anthracyl-alkyl-ketones which consists in acting on an anthracene body with a fatty acid halogenide by means of aluminium chlorid.

4. The process of producing anthracyl-alkyl-ketones having free meso-positions which consists in acting on an anthracene body with a fatty acid halogenide and a condensing agent under stronger conditions than are required for the formation of meso-anthracyl-alkyl-ketones.

5. The process of producing anthracyl-alkyl-ketones having free meso-positions which consists in acting on an anthracene body with a fatty acid halogenide and a condensing agent under mild conditions and subjecting the resulting meso-anthracyl-alkyl-ketone to a treatment with a condensing agent under stronger conditions.

6. As new articles of manufacture anthracyl-methyl-ketones.

7. As new articles of manufacture α-anthracyl-methyl-ketones.

8. As a new article of manufacture 1.5-diaceto-anthracene melting about between 212° and 215° C., forming yellow leaflets, dissolving to an orange yellow solution with yellow fluorescence in sulphuric acid and furnishing a diacetyl-anthraquinone melting about between 318° and 319° C. on oxidation by means of chromic acid.

In testimony whereof we have hereunto set our hands.

ARTHUR LÜTTRINGHAUS.
FILIP KAČER.